United States Patent [19]

McPherson et al.

[11] Patent Number: 4,458,889

[45] Date of Patent: Jul. 10, 1984

[54] LOCKING POWER CLAMP

[75] Inventors: Alexander W. McPherson, Farmington; Hazem N. Hamed, Troy, both of Mich.

[73] Assignee: Dover Corporation (De-Sta-Co. Div.), Birmingham, Mich.

[21] Appl. No.: 427,176

[22] Filed: Sep. 29, 1982

[51] Int. Cl.[3] .......................... B23Q 3/03; B25B 1/04

[52] U.S. Cl. .................................................. 269/32

[58] Field of Search .................... 269/32, 27, 24, 285, 269/239, 228, 91, 93, 94; 308/6 R

[56] References Cited

U.S. PATENT DOCUMENTS

| | | | |
|---|---|---|---|
| 3,365,253 | 1/1968 | Haller | 308/6 R |
| 3,469,892 | 9/1969 | Langstroth | 308/6 R |
| 3,570,835 | 3/1971 | McPherson | 269/32 |
| 3,702,185 | 11/1972 | Blatt | 269/32 |
| 4,019,784 | 4/1977 | Ladin et al. | 308/6 R |
| 4,234,057 | 11/1980 | Nakane | 308/6 R |

*Primary Examiner*—Robert C. Watson

[57] ABSTRACT

Air pressure actuated locking power clamp released from static loaded condition by air pressure no greater than locking pressure notwithstanding a differential smaller release pressure area due to piston rod of air cylinder. Highly pressurized needle bearings in straight track portions of the clamp which actuate links connected to a pivoted clamp arm are critical elements in providing unexpected low pressure release.

15 Claims, 8 Drawing Figures

LOCKING POWER CLAMP

BACKGROUND OF THE INVENTION

Air pressure actuated power clamps have been used for many years which employ straight piston rod stroke between opposed straight reaction guide tracks in which bearings for one end of parallel links are driven by the piston rod the other ends of which are pivotally connected to a clamp arm having a spaced pivotal connection to the clamp body. Actuation of the links toward a right angle relationship of link pivots to the reaction track articulates the clamp arm towards its clamping position. When the clamp arm is adjusted to provide maximum clamping pressure on a workpiece at standard factory air pressure such as 80 p.s.i. any travel to center or slight overcenter to a positive stop of the clamp arm has been found in most commercial clamps currently available to require a release pressure exceeding the 80 p.s.i. apply pressure by as much, for example, as 20 to 30 p.s.i. Accordingly, since this may result in a locked up clamp which cannot be released by standard air pressure such clamps are normally operated with a limiting travel of the piston rod to a linkage angle short of 90°, e.g. in the order of 85°, to assure that supply line pressure will always release the clamp. Such practice, however, does not assure that clamping pressure will remain engaged in the absence of actuating air pressure even though a self-locking friction angle is attempted since vibration of the workpiece may permit the component of release force to gradually urge the linkage to a release condition. While it may be tolerable to leave air pressure applied under conditions where the workpiece and clamp remain stationary near a supply line, there are many requirements in industry where the workpiece travels on a pallet, truck or platform having air operated power clamps which must remain clamped while traversing substantial areas in the plant. For many years the only solution to this working condition has been to employ portable air pressure tanks mounted on the moving work platform thereby providing means for maintaining clamp actuating air pressure throughout required transport of the clamped workpiece.

Notwithstanding long recognized need for a locking power clamp to permit the use of portable clamps on moving workpieces without having an accompanying portable air supply, a satisfactory solution has proved to be extremely elusive. Attempts have been made to decrease static friction at the center or overcenter position through lubrication and low friction bearing materials such as Teflon without success. In one known commercial clamp the combination of Teflon bearings and a spring element to accommodate overcenter locking has provided initially acceptable release forces but unacceptable durability under life cycle tests leading to unacceptable higher release values as wear occurred in the Teflon bearings together with problems of spring breakage from fatigue.

BRIEF SUMMARY OF THE PRESENT INVENTION

Applicants have found after extensive experimental testing a complete solution to the problem of providing a power clamp with positive center or slight overcenter locking which can always be released with no greater cylinder pressure than is employed in actuating the clamp to locking position. Indeed surprising and unexplained remarkable results have been obtained wherein consistently substantially *lower* release air pressures are required relative to available apply pressures e.g. in the order of 55 p.s.i. to release from a clamped condition which required 80 p.s.i. to apply notwithstanding release force reduced by the area of the piston rod. By employing special needle bearings having unusual proportions, as critical highly loaded track follower bearings engaging the opposed guide reaction tracks at the pivotal connection for the links passing to center or overcenter in the clamping operation, required results have been obtained which pass all life cycle durability and clamping force retention tests which industry requires. For example, in one durability test which required a 150 lb. clamping force at a given distance from the clamp arm pivot after five million cycles without clamp adjustment to compensate for pivot wear applicants construction retained 350 lbs. or more than double the minimum requirements.

A further remarkable unexpected result was discovered in comparing the performance of the clamp at the beginning and end of a five million cycle test where at the beginning a 950 lb. maximum clamping load was produced at 4¾" from the clamp arm pivot with 80 p.s.i. of pressure reaching a positive locking slight overcenter position which required a release pressure of 70 p.s.i., and at the end of the five million cycle test the clamp was able to produce 1450 lbs. of clamping pressure at the same pressure point with 80 p.s.i. of pressure and only 55 p.s.i. was required to release the clamp. Thus, the performance of the clamp both in efficiency of producing clamping pressure and minimization of release force drammatically improved after a five million cycle durability test.

The key feature of releasing from a positive slightly overcenter locked condition with no more, and actually less air pressure, than required to produce locking engagement was particularly surprising and unexplainable by applicants in view of their experience with plain steel bearings wherein an 80 lb. pressure was accompanied by a release pressure requirement in the range of 110 to 120 lbs. Such higher release pressure was consistent with conventional experience that static coefficient of friction, such as encountered in initiating release movement from applied clamp pressure, would be higher than dynamic coefficient of friction encountered in moving the clamp arm to its clamping position. Accordingly, it was a completely unexpected phenomena to find the apparent effective static coefficient of friction for the needle bearings employed to provide a reduction rather than increase relative to the moving coefficient of friction encountered during engagement.

BRIEF DESCRIPTION OF THE DRAWINGS

With reference to FIGS. 1–3 and 7 the power clamp of the present invention comprises clamp head 10 actuated by power cylinder 11 adapted to move 90° clamp arm 12 through coupling 13, piston rod 14 and links 15 to the clamping position shown in full line relative to any base or worktable to which clamp head may be secured through any of the unnumbered multiple cross bolt holes illustrated in FIGS. 1 and 2. Clamp head 10 comprises two symmetrical forging body halves 19 connected by bolt 16 with spacer 17 and by bolt 18 passing through clamp arm 12. Square cross pin 22 seated in square recesses 23 in the respective body halves is provided with a stop shoulder 24 which serves as a spacer for the lower body halves as well as providing a stop surface 25 for abutting clamp arm surface 26 in clamping position. Nut 28 is staked at a tightened position against the shoulders of cross pin 22 which is dimensioned to provide free pivotal movement of links 15 and clamp arm 12 between guide surfaces 27 provided by the inner surfaces of the body halves. A spacer bushing not shown for bolt 18 also assures proper clearance.

Figure 7:
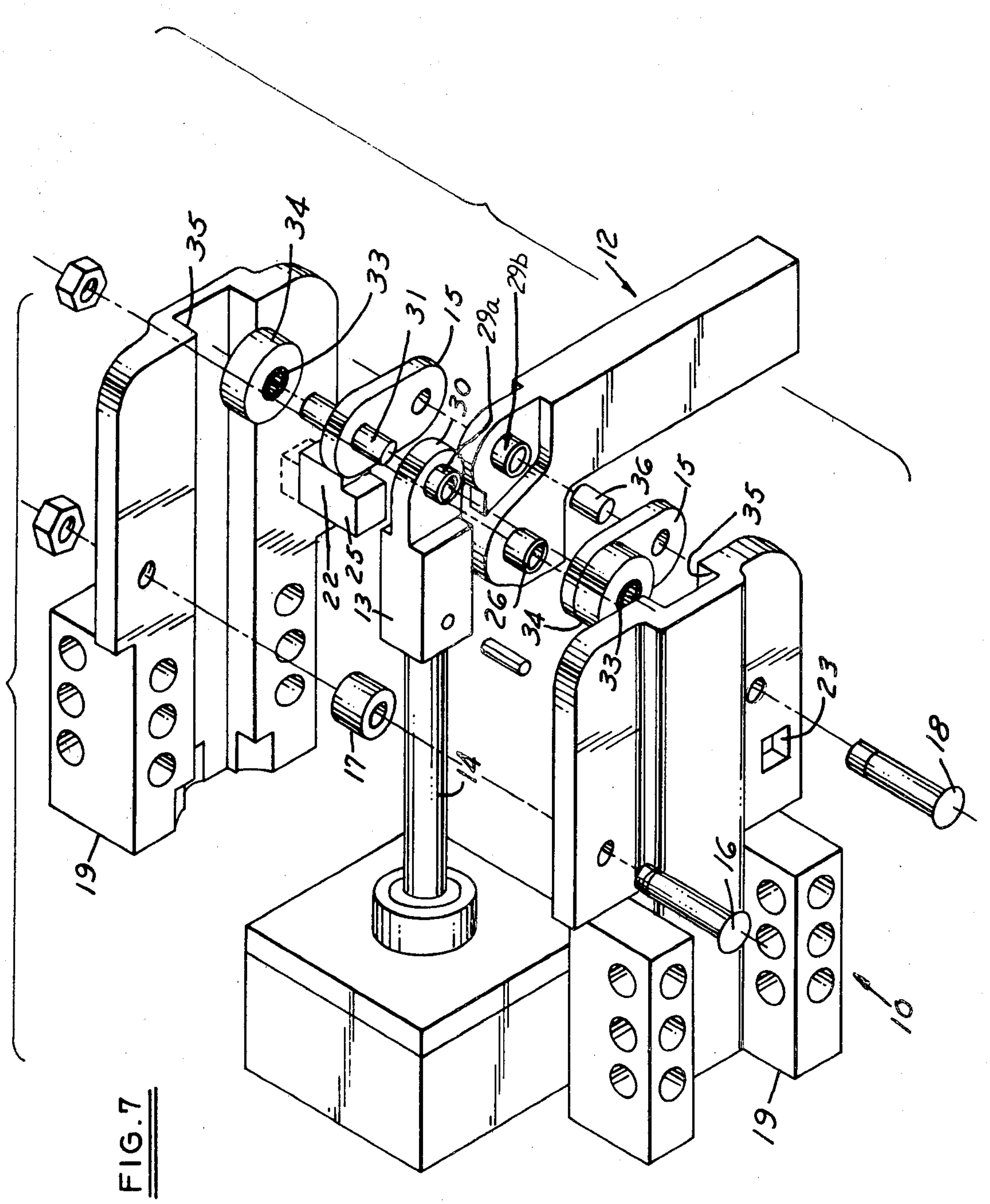
FIG. 7 is an exploded view of the power clamp illustrated in FIGS. 1, 2 and 3.

Linkage for actuating clamp arm 12 through piston rod 14 includes coupling 13 having reduced end 30 extending between links 15 connected thereto by shaft 31 forming the inner race for spaced needle bearings 32 each having needles 33 and outer track follower race 34 engaging longitudinal slot track 35 in each of the forged halves 19 of clamp head 10. As best shown in FIG. 7, links 15 are pivotally connected at their lower ends by pivot pin 36 to a reduced end of clamp arm 12, bushings **29*a* and 29*b* being pressed into flush position in the respective reduced ends to pivotally receive respectively shaft 31, having ends pressed through links 15, and pin 36, having ends pressed into the lower ends of links 15**.

In order to achieve positive locking of the clamp arm needle bearing 32 passes slightly overcenter (beyond right angle relation with pivot pin 36) relative to reaction guide track surface 35, e.g. approximately in the order of 0.010 to 0.020 of an inch in the case of link pivot spacing of 1⅛".

From the description thus far it will be seen that retraction of piston rod 14 from the locked condition of the clamp arm 12 shown in full line will pull bearing 32 and the upper end of link 15 through center to a release condition and cause arm 12 to pivot about bolt 18 through a maximum arc of 119° to a position shown by dotted line 37. In the case of an optional 180° arm such as shown by dotted line position 38 in its clamping position, retraction through a 96° maximum arc will move the arm to dotted line position 39.

Figure 1:
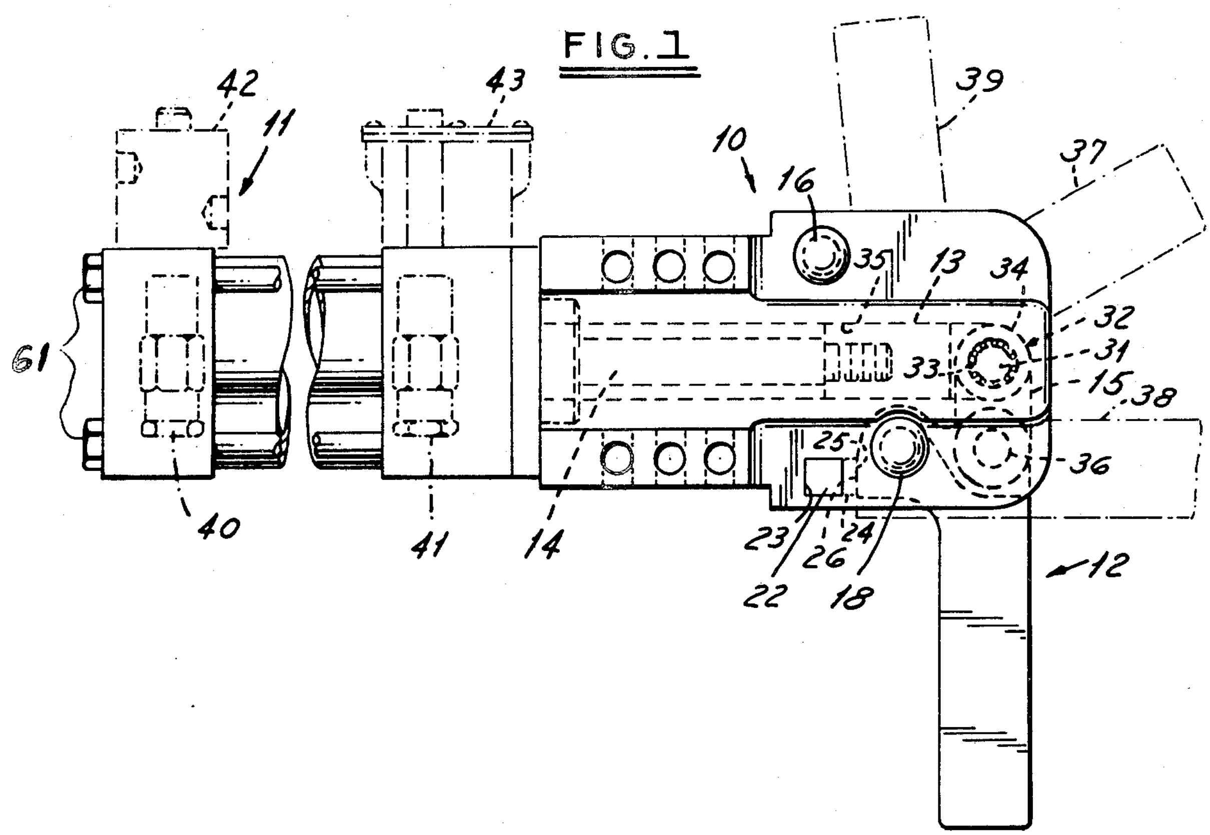
FIG. 1 is a side elevation of the power clamp of the present invention.
Figure 2:
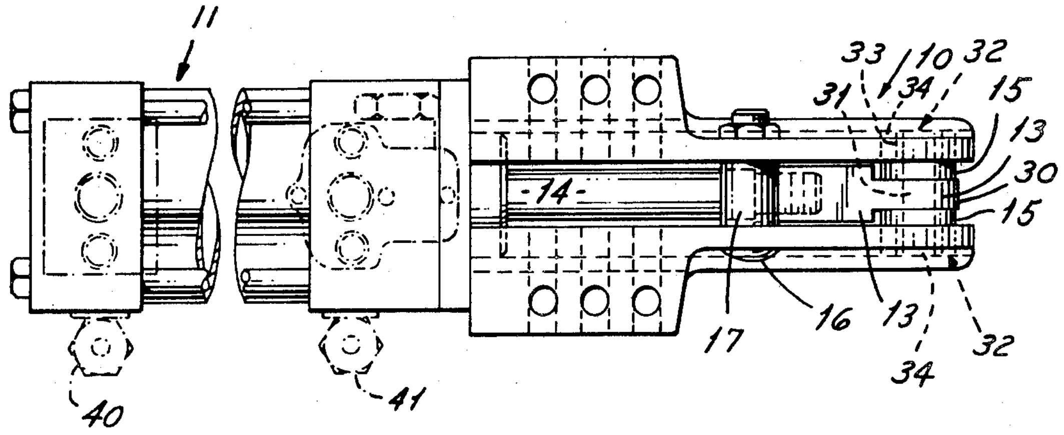
FIG. 2 is a plan view of the clamp.
Figure 3:
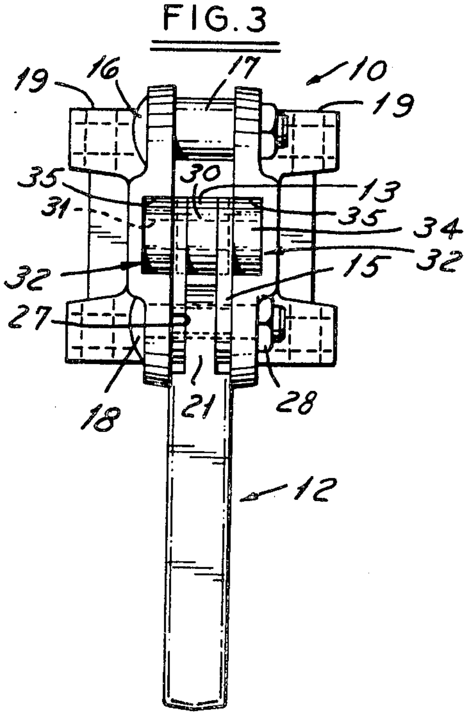
FIG. 3 is an end elevation of the clamp.

Cylinder 11 is suitably secured to the end of clamp head 10 by four external bolts 61. Optional flow control couplings for air supply at the cap end 40 and rod end 41 are shown in FIGS. 1 and 2 as well as air limit valve 42 and an alternative electrical proximity switch 43 for monitoring piston movement to physically sense and signal when the piston has reached a full stroke position.

Figure 4:
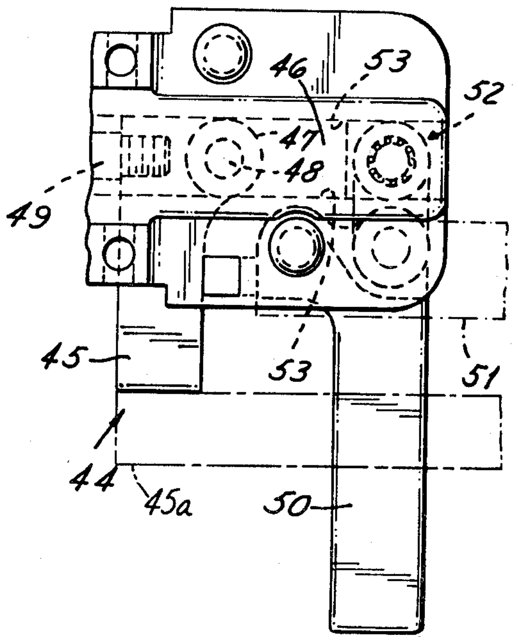
FIG. 4 is a fragmentary side elevation similar to FIG. 1 illustrating a modified embodiment incorporating an auxiliary clamp arm.
Figure 8:
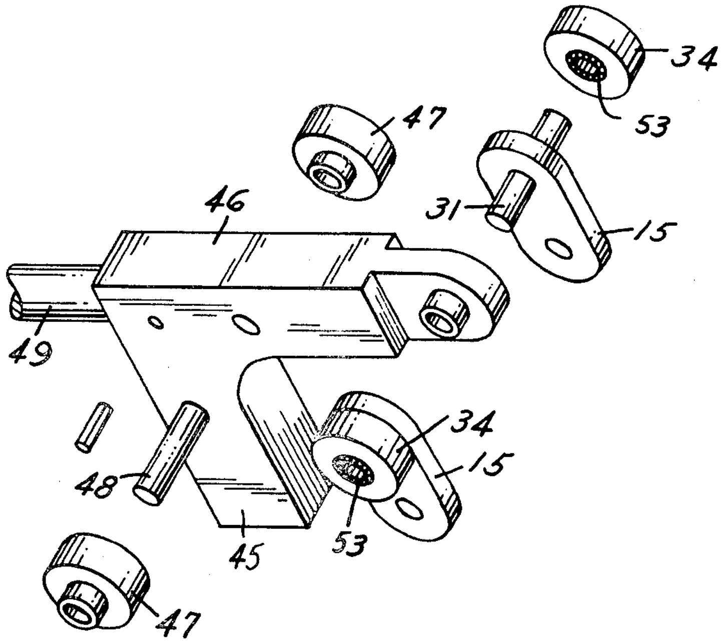
FIG. 8 is an is an exploded view of the pressure clevis illustrated in FIG. 4.

With reference to FIGS. 4 and 8 an optional pressure clamp feature 44 may be employed by adding arm 45 to a lengthened piston rod coupling 46 having supplemental track engaging rollers 47 mounted on cross pin 48. With this optional feature the auxiliary clamp arm 45 will travel in linear relation with piston rod 49 toward a clamping relationship with pivoting arm 50, clamping pressure in this case being limited to the axial force which is applied to the piston rod. With this feature a workpiece may be clamped between pivoting arm 50 and supplemental arm 45 independent of any reaction base normally employed with a clamp arm such as 12 in FIG. 1. In such case the workpiece may be held manually in a position for clamp engagement upon piston actuation or it may be prepositioned on a base surface at a level appropriate for clamp engagement by arms 45 and 50, in which case the base could operate as a reaction surface for any physical operation while the workpiece is held from moving by the clamp arms. If the supplemental arm 45 is adapted with a right angle extended arm **45*a* for parallel clamping relationship with an optional 180° arm 51, such limitation will not exist since the leverage of clamping force exerted against arm 45 45*a* will be absorbed by the spaced bearings of roller 47 and needle bearing 52 on the reaction track surfaces 53. As in the case of arms 45 and 50, a workpiece may likewise be directly clamped between optional arms 51 and 45*a*, shown in phantom in FIG. 4**, with either manual or base surface appropriate prepositioning of the workpiece.

Figure 5:
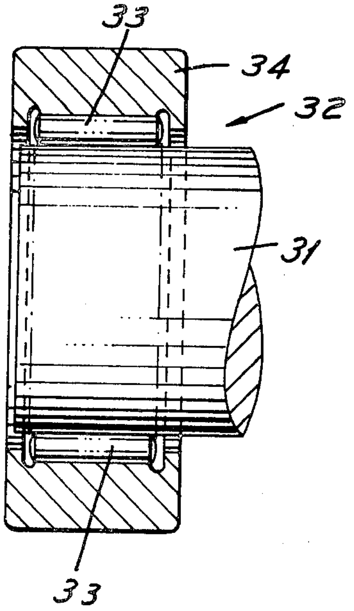
FIG. 5 is a sectional view of the needle bearing employed in the power clamp of the present invention.

With reference to FIG. 5 the sectional view of the needle bearing 32 indicates relative proportions of inner race shaft 31, needles 33 and outer race track follower 34.

Figure 6:
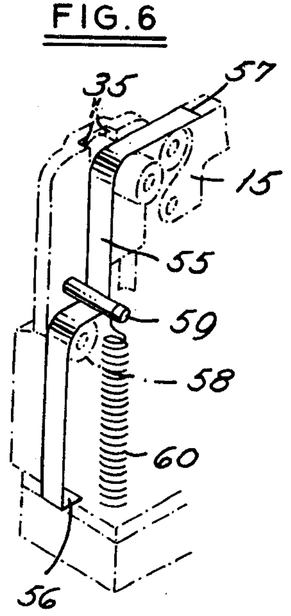
FIG. 6 is a perspective view of an optional track cover to minimize intrusion of dirt into track and bearing surfaces.

With reference to FIG. 6 an optional tape track cover 55 may be secured at its lower end 56 to the base of its upper end 57 to the clamp arm extending over the pivot links 15 covering track surfaces 35 and over a stationary roll 58 with slack taken up by a pin 59 and a pair of springs 60 to accommodate change in length during actuation of the clamp. Such provision serves to contribute to the life of the clamp by effectively excluding access of dirt and dust during operation.

Following is an example of specific values for component parts of a power clamp constructed in accordance with the present invention as illustrated in the drawings which has successfully passed an industry five million cycle test: Pivot spacing of 1⅛" between pivots 31 and 36 and 1¼" between pivots 36 and 18; needle bearings 32 with 1" o.d., 0.585" i.d., and 0.405" width for outer race 34, and ½" o.d. for shaft 31 (special uncataloged bearing of the Torrington Company providing needle contact width approximately ¼ of the o.d. produced under Part No. AG 57623 and having basic dynamic load rating of 1240 lbs. and basic static load rating of 1420 lbs.); links 15 made of 1045 steel heat treated to RC 45–50 with shaft 31 press fit in links constructed of 52100 bearing steel, RC 60–65 with a micro-finish of RMS 16; bushings not shown constructed of 52100 bearing steel having RC 60–65 pressed in the narrow end of arm 12 as bearing for pin 36 and in end of coupling 13 as bearing for shaft 31; bushing not shown serving as a spacer on bolt 18 made of low carbon 11L17 having a carbo nitride surface to a depth of 0.005–0.010" heat treated to RC 60 having a slip fit as pivot for arm 12 made as a forging from medium carbon 1141 with no heat treat; sides 19 of body made of 1144 medium carbon forging steel with tracks broached and flame hardened for 2" area at end which is loaded by bearings 32; stop 22 constructed of low carbon 11 L 17 steel with 0.030–0.040" case having RC 55–60 hardness. In a five million cycle durability test applicant's power clamp so constructed was initially clamped at a distance 4.75" from pivot 36 with a 520 lb. load and without adjustment to compensate for wear finished with a load of 350 lbs, more than double the required 150 lbs. required by typical industry specifications.

Flow control valves 40 and 41 were employed to control speed and the unit was tested with both air limit valve 42 providing a position valve signal responsive to piston forward and back positions and with the equivalent proximity switch 43 providing electrical signals.

We claim:

1. Power clamp comprising clamp base means provided with reaction guide track means, track follower means, clamp arm means pivotally connected to said base means, actuating linkage means having spaced pivots respectively confined to said guide track means by said track follower means and having an actuating connection with said clamp arm means, coupling means adapted for connection to a reciprocable power source for actuating said track follower means along said track means and through said linkage means to provide pivotal movement of said arm means to respective clamp and release positions, and stop means limiting said movement to a locked clamping position of said link means, said track following means including anti-friction bearing means with rolling elements adapted to enable release actuating movement with less force than clamp locking movement.

2. Power clamp of claim 1 including needle bearing track follower means.

3. Power clamp of claim 1 including a spaced pair of needle bearing track follower means wherein the width of needle bearing contact with respective races of each bearing is approximately ½ the outer diameter of such bearing.

4. Power clamp of claim 1 including parallel opposed straight reaction guide tracks.

5. Power clamp of claim 4 wherein said tracks are provided in a two-piece clamp base.

6. Power clamp of claim 1 wherein all pivots other than provided by said track follower means comprise plain sleeve bearings.

7. Power clamp of claim 1 wherein said stop means is set for link travel at least to a right angle relation of said spaced pivots to said track means.

8. Power clamp of claim 1 wherein said stop means is set for link travel slightly past a right angle relationship of said spaced pivots to said track means.

9. Power clamp of any of claim 1–8 including a power cylinder and piston rod for actuating said linkage means.

10. Power clamp of claim 9 wherein said power cylinder comprises an air cylinder adapted to operate with 80 p.s.i. pressure.

11. Power clamp of claim 10 including pressure jaw means actuated with linear travel guided by said track means adapted to clamp a workpiece in cooperation with said pivoted clamp arm means.

12. Power clamp as set forth in claim 9 wherein said clamp arm means when actuated to clamping position extends substantially normal to said track means.

13. Power clamp as set forth in claim 9 wherein said said clamp arm means extends substantially parallel to said track means.

14. Power clamp of claim 1 including tape cover means protecting said track means and linkage.

15. Power clamp of claim 1 including mounting provisions on said base means for mounting any of four sides to a base plate.

* * * * *